United States Patent
Kwak

(10) Patent No.: US 10,915,276 B2
(45) Date of Patent: Feb. 9, 2021

(54) DEFECT CONTROL IN SECURITY SETTING OF IMAGE FORMING APPARATUS

(71) Applicant: HEWLETT-PACKARD DEVELOPMENT COMPANY, L.P., Spring, TX (US)

(72) Inventor: Jong Seob Kwak, Pangyo (KR)

(73) Assignee: HEWLETT-PACKARD DEVELOPMENT COMPANY, L.P., Spring, TX (US)

(*) Notice: Subject to any disclaimer, the term of this patent is extended or adjusted under 35 U.S.C. 154(b) by 0 days.

(21) Appl. No.: 16/629,191

(22) PCT Filed: Jul. 5, 2018

(86) PCT No.: PCT/KR2018/007627
§ 371 (c)(1),
(2) Date: Jan. 7, 2020

(87) PCT Pub. No.: WO2019/017627
PCT Pub. Date: Jan. 24, 2019

(65) Prior Publication Data
US 2020/0225891 A1    Jul. 16, 2020

(30) Foreign Application Priority Data

Jul. 18, 2017 (KR) .......... 10-2017-0091062

(51) Int. Cl.
*G06F 3/12* (2006.01)
*G06F 21/60* (2013.01)
*H04L 9/14* (2006.01)

(52) U.S. Cl.
CPC .......... *G06F 3/1231* (2013.01); *G06F 3/1222* (2013.01); *G06F 3/1238* (2013.01); *G06F 21/602* (2013.01); *G06F 21/608* (2013.01); *H04L 9/14* (2013.01)

(58) Field of Classification Search
None
See application file for complete search history.

(56) References Cited

U.S. PATENT DOCUMENTS

| | | | | |
|---|---|---|---|---|
| 8,050,709 | B2* | 11/2011 | Hall | H04W 12/0609 455/556.1 |
| 8,799,638 | B2* | 8/2014 | Ogata | H04L 9/16 713/150 |
| 8,860,965 | B2* | 10/2014 | Miyata | G06F 3/1285 358/1.13 |
| 2003/0226039 | A1 | 12/2003 | Maki | |
| 2006/0105714 | A1 | 5/2006 | Hall | |
| 2006/0250644 | A1* | 11/2006 | Yamauchi | H04N 1/00233 358/1.15 |
| 2007/0206217 | A1* | 9/2007 | Maruyama | G06F 3/1208 358/1.15 |

(Continued)

FOREIGN PATENT DOCUMENTS

KR    20170036650    4/2017

*Primary Examiner* — Paul F Payer
(74) *Attorney, Agent, or Firm* — Staas & Halsey LLP

(57) ABSTRACT

An image forming apparatus is provided. The image forming apparatus may determine whether encrypted data may be transmitted or received between the image forming apparatus and one or more external devices, and determine a defect in security set to the image forming apparatus based on the determination.

20 Claims, 14 Drawing Sheets

(56) References Cited

U.S. PATENT DOCUMENTS

2013/0010327 A1  1/2013  Miyata
2015/0082036 A1  3/2015  Takeda
2016/0150122 A1  5/2016  Hayama et al.

* cited by examiner

[Fig. 1]
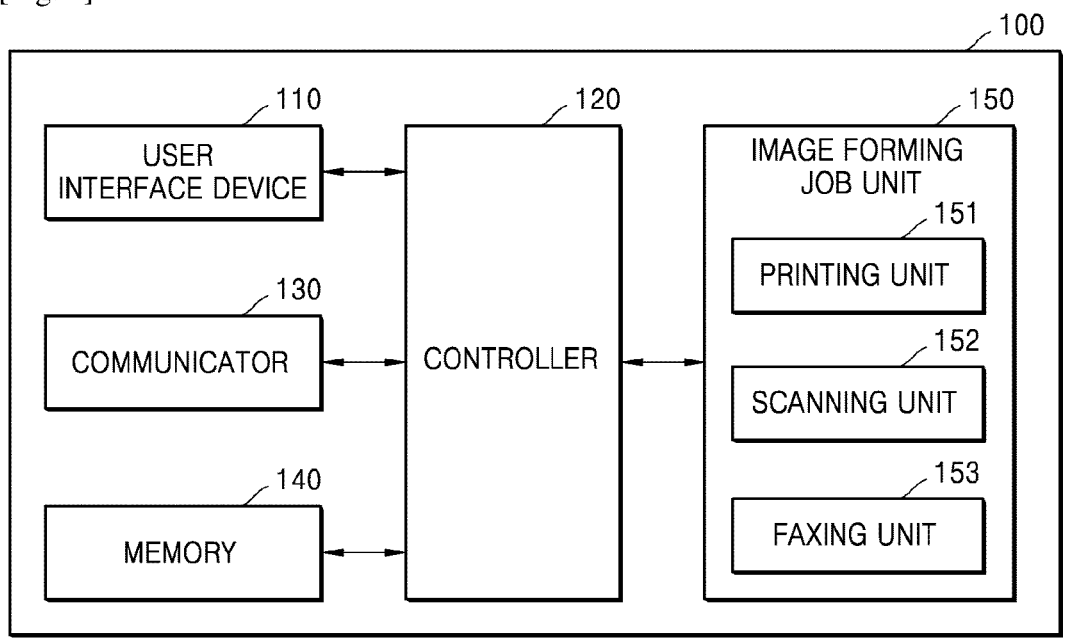

[Fig. 2]
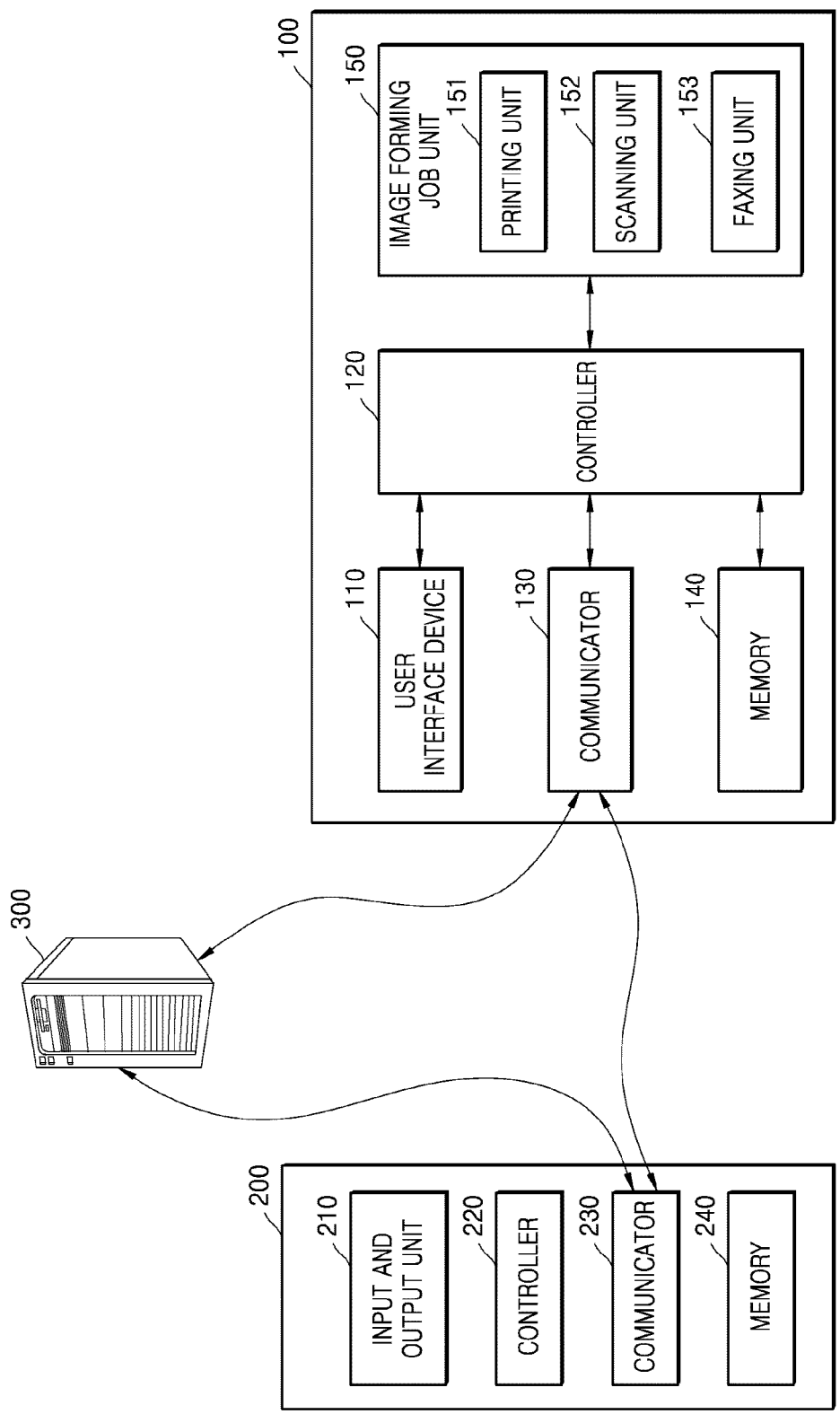

[Fig. 3]
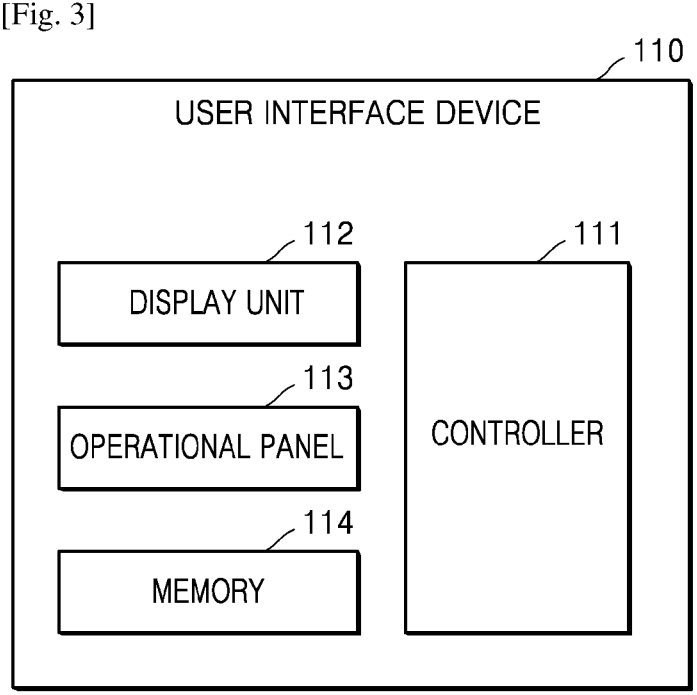

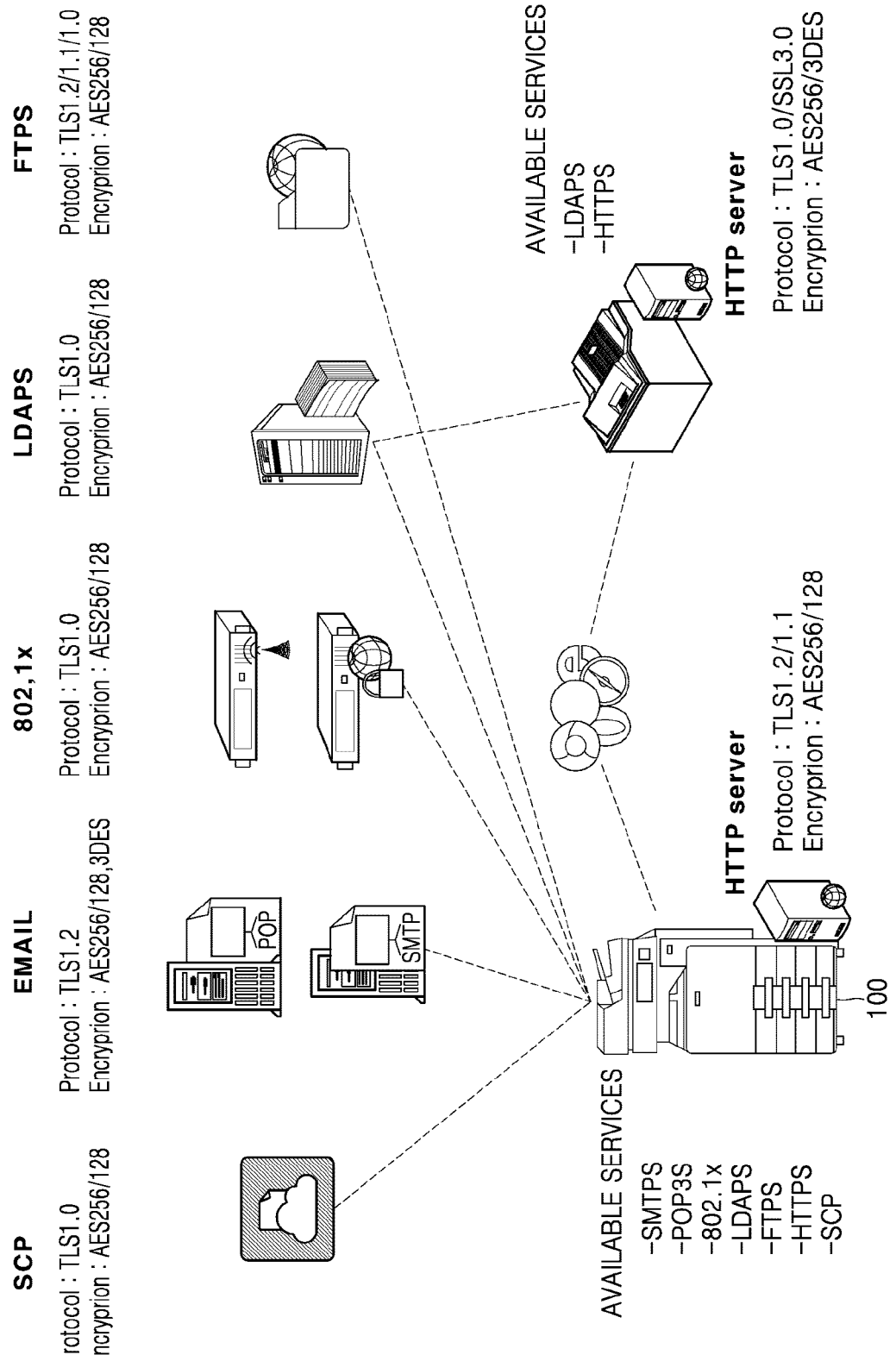
[Fig. 4]

[Fig. 5]
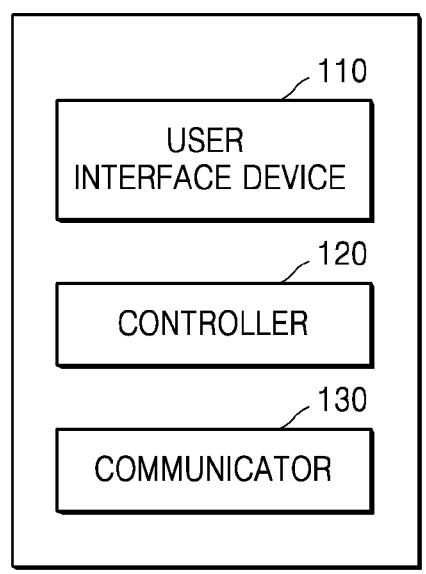

[Fig. 6]
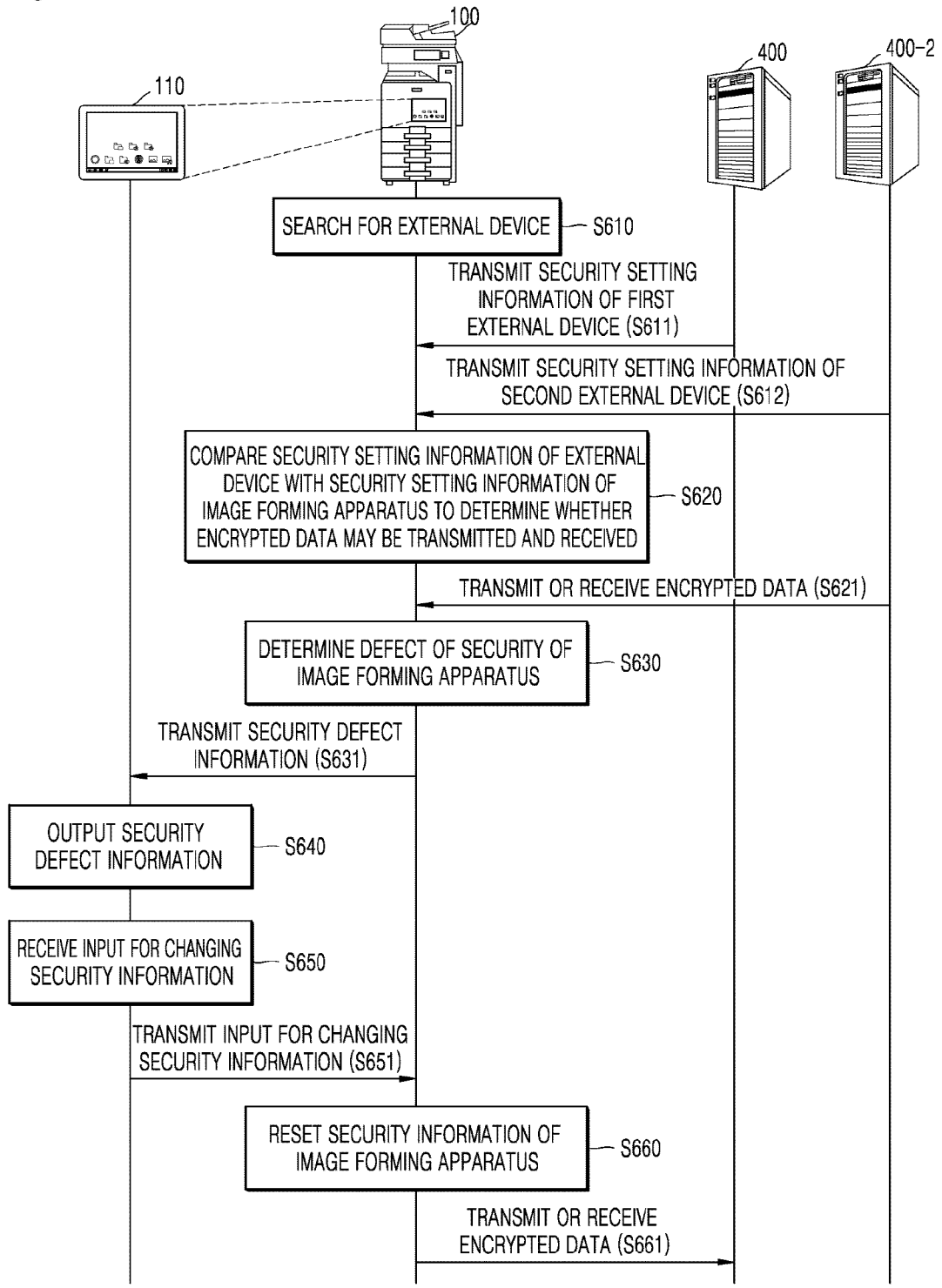

[Fig. 7]
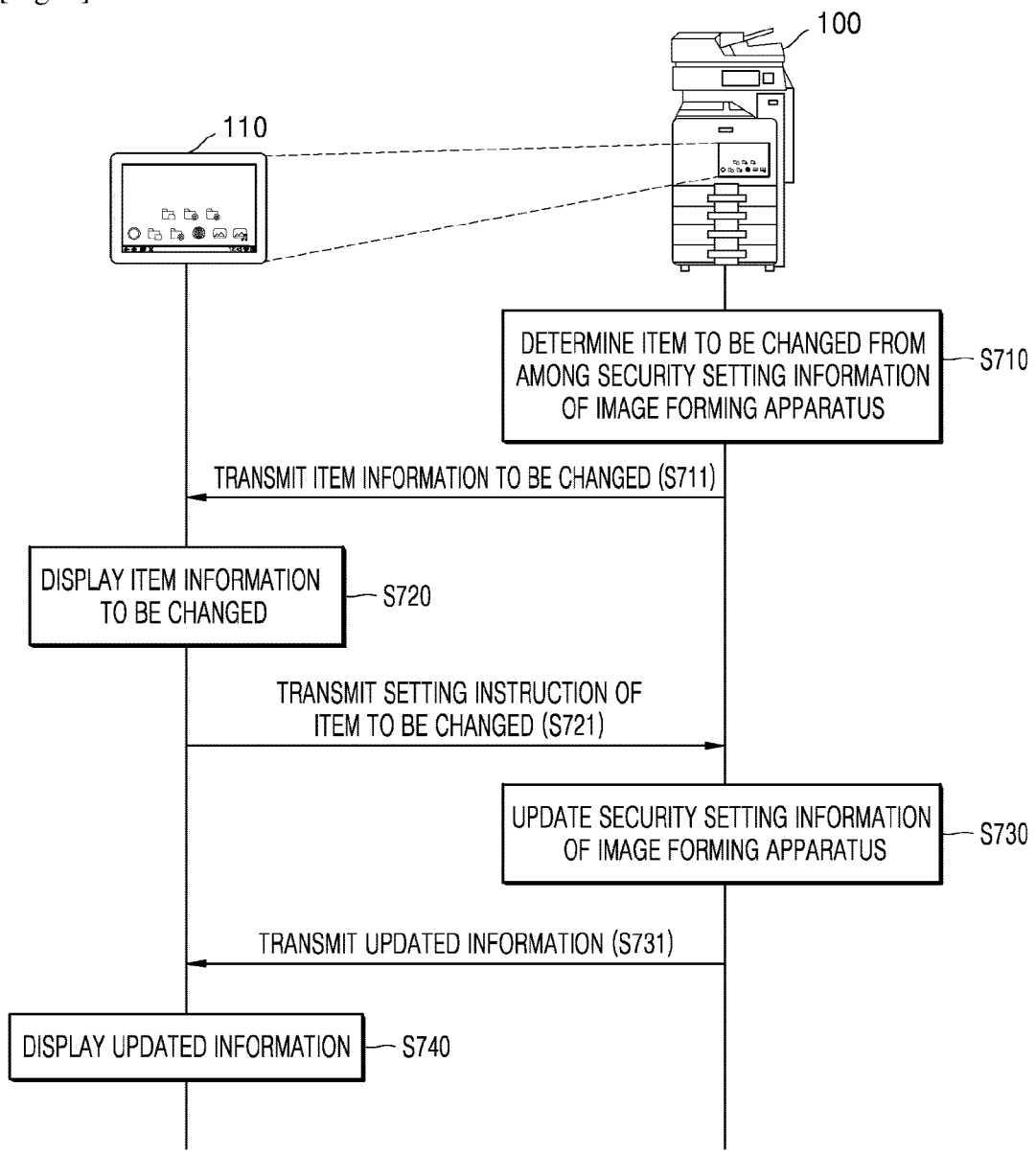

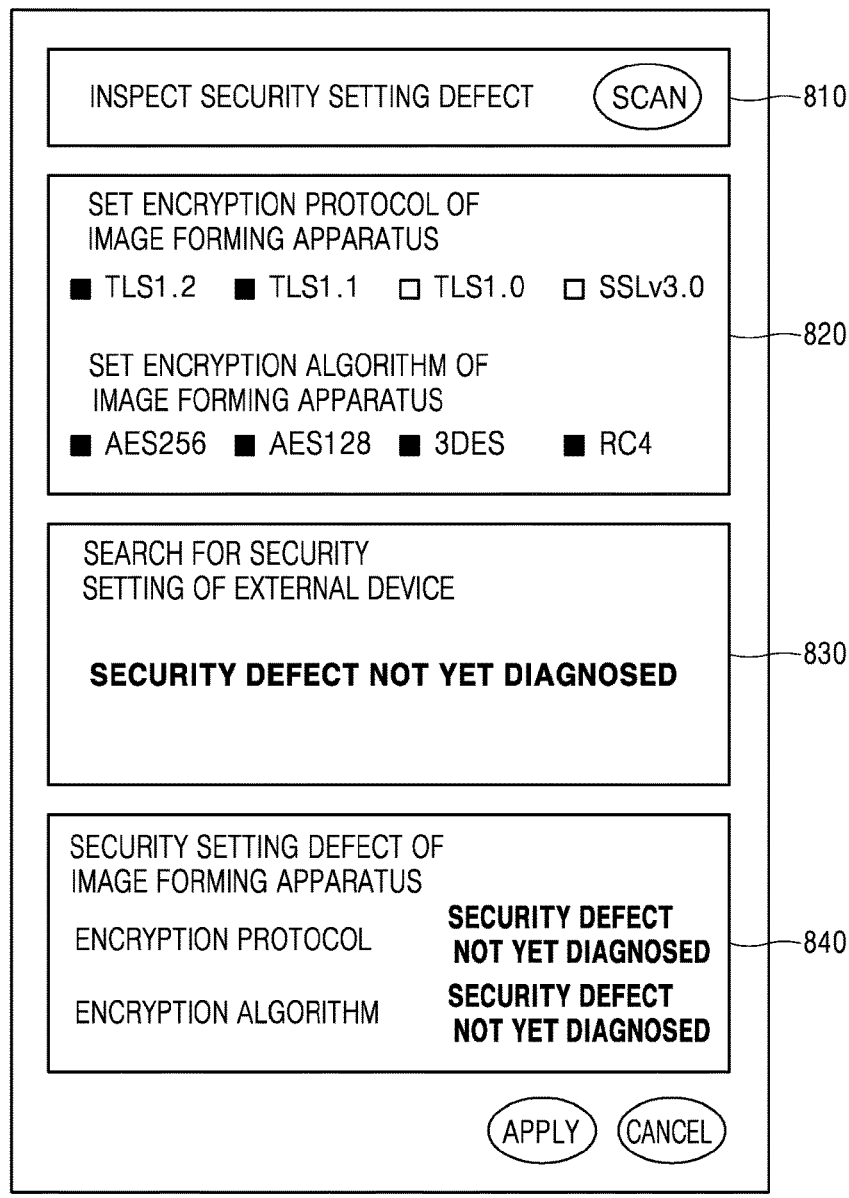

[Fig. 10]

| ENCRYPTION PROTOCOL | |
|---|---|
| TLS 1.2 | O |
| TLS 1.1 | O |
| TLS 1.0 | X |
| SSL 3.0 | X |

| ENCRYPTION ALGORITHM | |
|---|---|
| AES256 | O |
| AES128 | O |
| 3DES | O |
| RC4 | X |

[Fig. 11]

| | TLS 1.2 | TLS 1.1 | TLS 1.0 | SSL 3.0 | AES 256 | AES 128 | 3DES | RC4 |
|---|---|---|---|---|---|---|---|---|
| WHETHER TO BE ADDED OR REMOVED | | | + | | | | − | |

1101    1102

[Fig. 12]
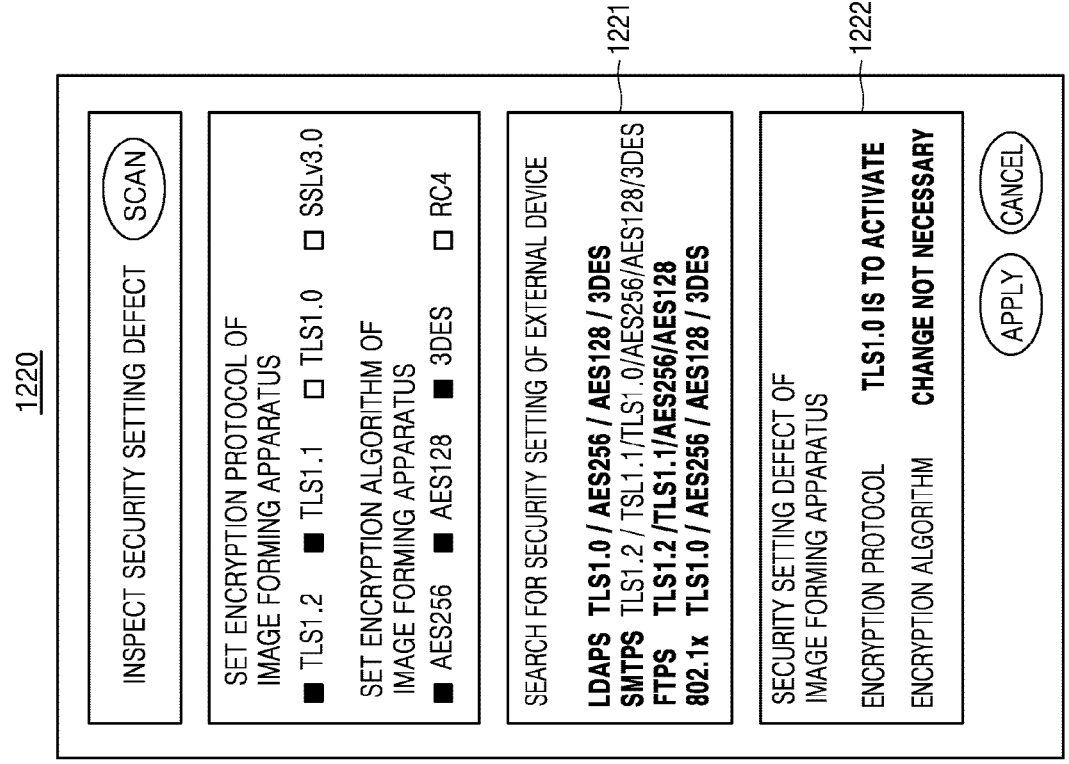
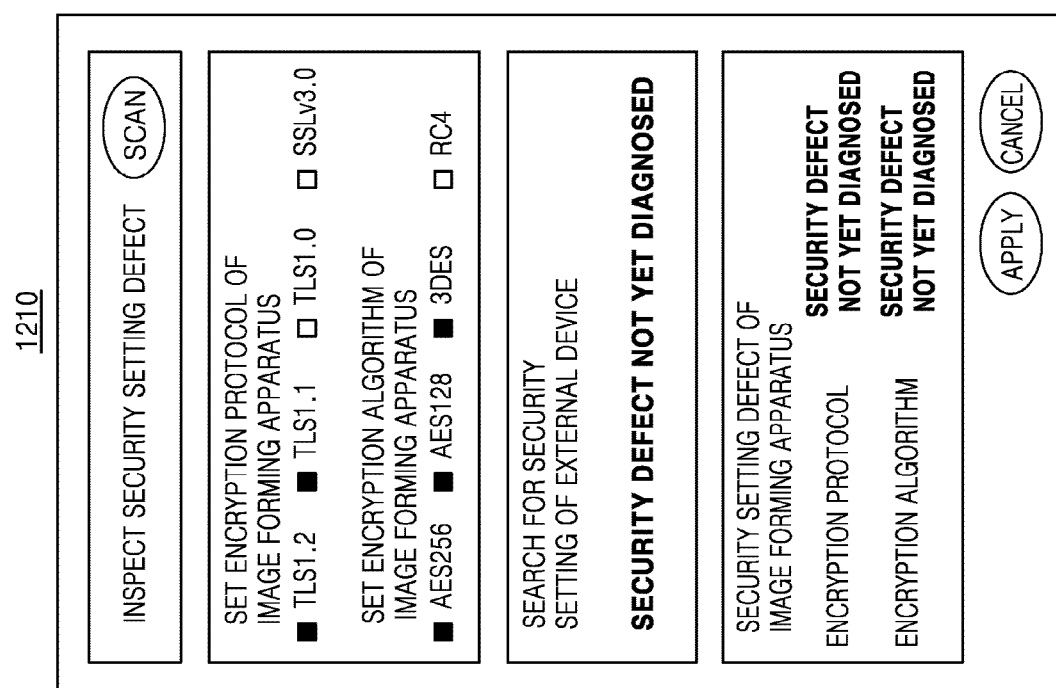

INSPECT SECURITY SETTING DEFECT [SCAN]

SET ENCRYPTION PROTOCOL OF IMAGE FORMING APPARATUS
■ TLS1.2  ■ TLS1.1  ■ TLS1.0  □ SSLv3.0

SET ENCRYPTION ALGORITHM OF IMAGE FORMING APPARATUS
■ AES256  ■ AES128  ■ 3DES  ■ RC4

SEARCH FOR SECURITY SETTING OF EXTERNAL DEVICE — 1321

LDAPS   TLS1.0 / AES256 / AES128 / 3DES
SMTPS  TLS1.2 / TSL1.1/TLS1.0/AES256/AES128/3DES
FTPS      TLS1.2 /TLS1.1/AES256/AES128
802.1x    TLS1.0 / AES256 / AES128 / 3DES

SECURITY SETTING DEFECT OF IMAGE FORMING APPARATUS — 1322

ENCRYPTION PROTOCOL        CHANGE NOT NECESSARY
ENCRYPTION ALGORITHM       RC4 IS TO INACTIVATE

[APPLY] [CANCEL]

⇑

1310

INSPECT SECURITY SETTING DEFECT [SCAN]

SET ENCRYPTION PROTOCOL OF IMAGE FORMING APPARATUS
■ TLS1.2  ■ TLS1.1  ■ TLS1.0  □ SSLv3.0

SET ENCRYPTION ALGORITHM OF IMAGE FORMING APPARATUS
■ AES256  ■ AES128  ■ 3DES  ■ RC4

SEARCH FOR SECURITY SETTING OF EXTERNAL DEVICE

SECURITY DEFECT NOT YET DIAGNOSED

SECURITY SETTING DEFECT OF IMAGE FORMING APPARATUS

ENCRYPTION PROTOCOL        SECURITY DEFECT NOT YET DIAGNOSED
ENCRYPTION ALGORITHM       SECURITY DEFECT NOT YET DIAGNOSED

[APPLY] [CANCEL]

[Fig. 14]
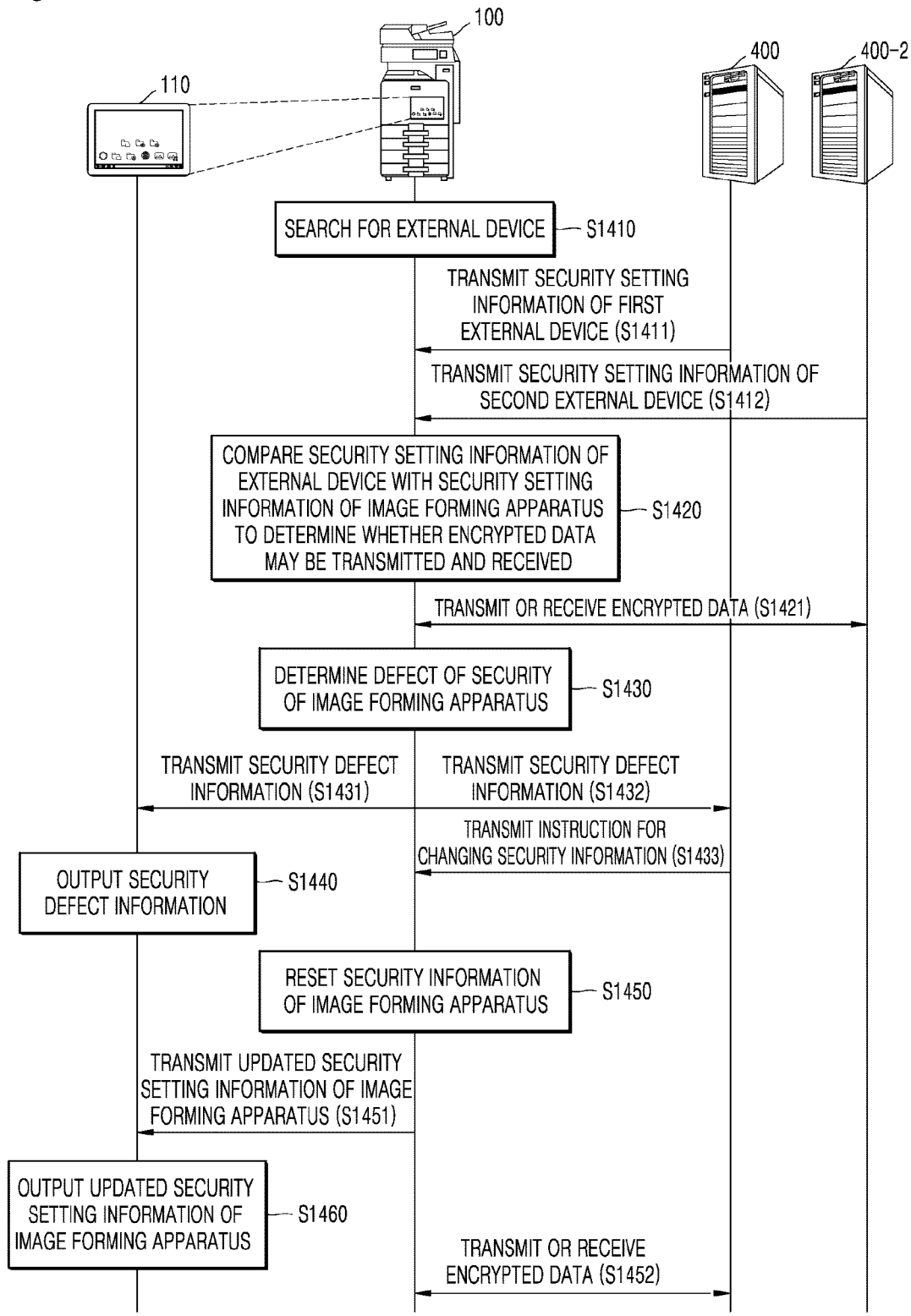

[Fig. 15]
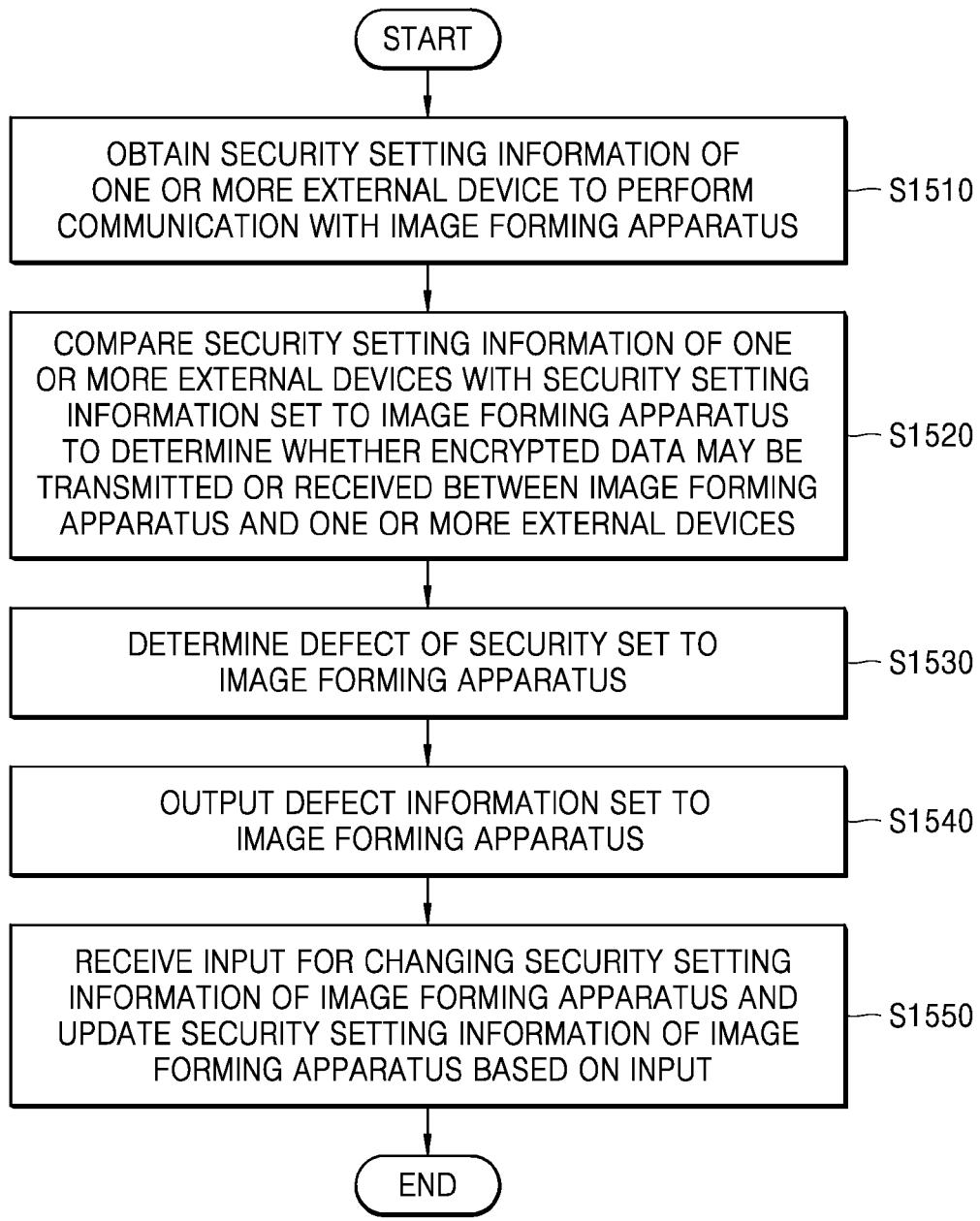

[Fig. 16]
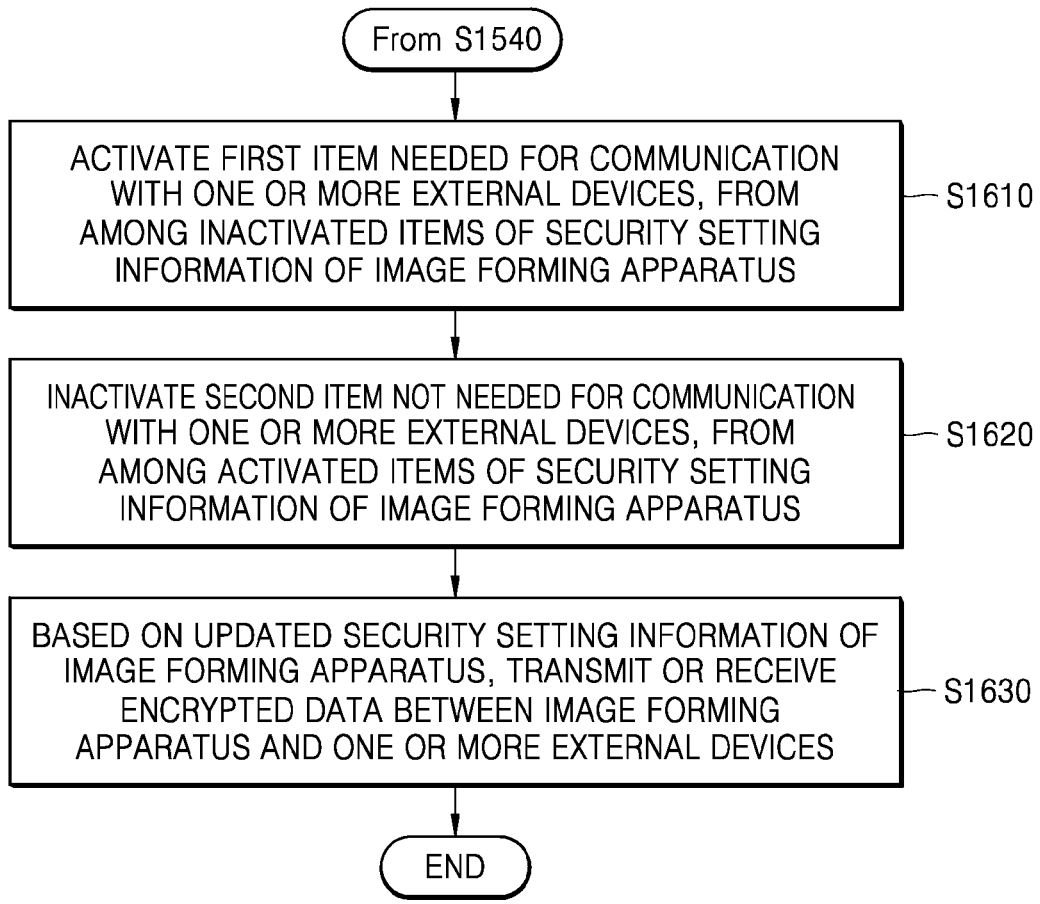

DEFECT CONTROL IN SECURITY SETTING OF IMAGE FORMING APPARATUS

CROSS-REFERENCE TO RELATED APPLICATIONS

This application is filed under 35 U.S.C. 0.371 as a PCT national phase of PCT International Application No. PCT/KR2018/007627, filed on Jul. 5, 2018, in the Korean Intellectual Property Office, which claims the priority benefit of Korean Patent Application No. 10-2017-0091062, filed on Jul. 18, 2017 in the Korean Intellectual Property Office, the contents of the PCT International Application and the Korean Patent Application are incorporated by reference herein in their entirety.

BACKGROUND ART

The disclosure relates to image forming apparatuses and methods of operating the image forming apparatuses.

When connecting an external device and an image forming apparatus to each other using an encryption protocol, a method of setting the encryption protocol and an encryption algorithm may be set by a user according to a security policy.

Due to a security policy of the external device and the image forming apparatus, the external device may have a higher security level than the image forming apparatus. Therefore, when an image forming apparatus with a relatively low security level attempts to communicate with an external device having a relatively high security level, a situation in which a service of the image forming apparatus is impossible may occur.

Thus, there is the need for an image forming apparatus and an operation method of the image forming apparatus, whereby a service of the image forming apparatus may be smoothly provided by preemptively preventing security defects that may occur in the image forming apparatus.

DESCRIPTION OF DRAWINGS

The disclosure may be readily understood by reference to the following examples and the accompanying drawings, in which reference numerals refer to structural elements.

The above and other aspects, features, and advantages of certain examples of the disclosure will be more apparent from the following description taken in conjunction with the accompanying drawings, in which:

FIG. 1 illustrates a configuration of an image forming apparatus according to an example;

FIG. 2 is a view illustrating an image forming apparatus connected to a user terminal or a server according to an example;

FIG. 3 is a block diagram of a user interface device according to an example;

FIG. 4 is a diagram for describing an operation of transmitting and receiving encrypted data between an image forming apparatus and an external device by using an encryption protocol and an encryption algorithm according to an example;

FIG. 5 is a structural diagram of an image forming apparatus according to an example;

FIG. 6 is a diagram for describing an operation of determining a defect in security information set to an image forming apparatus and resetting security of the image forming apparatus based on defect information according to an example;

FIG. 7 is a diagram for describing an operation of updating security setting information of an image forming apparatus according to an example;

FIG. 8 illustrates an example of displaying a screen for setting security of an image forming apparatus of a user interface device of the image forming apparatus according to an example;

FIG. 9 illustrates an example of a table including security setting information of an external device in an image forming apparatus according to an example;

FIG. 10 illustrates an example of a table including security setting information of an image forming apparatus according to an example;

FIG. 11 illustrates an example of a table including items to be updated from among security setting information of an image forming apparatus according to an example;

FIG. 12 illustrates an example of determining a security defect of an image forming apparatus and displaying a screen providing defect information on a user interface device of the image forming apparatus according to an example;

FIG. 13 illustrates an example of determining a security defect of an image forming apparatus and displaying a screen providing defect information on a user interface device of the image forming apparatus according to another example;

FIG. 14 is a diagram for describing an operation of determining a defect in security information set to an image forming apparatus and resetting security of the image forming apparatus based on defect information according to another example;

FIG. 15 is a flowchart of a method of operating an image forming apparatus according to an example; and FIG. 16 is a flowchart of a method of operating an image forming apparatus, in which security setting information of the image forming apparatus is updated to control the image forming apparatus, and an external device such that the image forming apparatus and the external device transmit and receive encrypted data to or from each other according to an example.

Throughout the drawings, like reference numerals will be understood to refer to like parts, components, and structures.

MODE FOR INVENTION

As used herein, the term "and/or" includes any and all combinations of one or more of the associated listed items. Expressions such as "at least one of," when preceding a list of elements, modify the entire list of elements and do not modify the individual elements of the list.

The terms used in this specification are those general terms currently widely used in the art in consideration of functions in regard to the disclosure, but the terms may vary according to the intention of those of ordinary skill in the art, precedents, or new technology in the art. Also, specified terms may be selected by the applicant, and in this case, the meaning thereof will be described in the following description of the disclosure. Thus, the terms used in the specification should be understood not as simple names but based on the meaning of the terms and the overall description of the disclosure.

Throughout the specification, when a portion "includes" an element, another element may be further included, rather than excluding the existence of the other element, unless otherwise described. In addition, the term "unit" used in the specification may denote an element composed of hardware, such as a field programmable gate array (FPGA) or an application-specific integrated circuit (ASIC), or software and may perform a particular task. However, the "unit" is not limited to software and hardware and may be a non-transitory storing medium containing instructions for addressing and controlling at least one processor. Thus, the "unit" may include, for example, components such as software components, object-oriented software components, class components and task components, and processes, functions, attributes, procedures, subroutines, segments of program codes, drivers, arrays, and variables. The functions provided by the components may be combined and assigned to a smaller number of components or other "units" or may be further divided and assigned to additional components or other "units."

While such terms as "first," "second," etc., may be used to describe various elements, such elements must not be limited to the above terms. The above terms are used only to distinguish one element from another. For example, without departing a scope of rights of the specification, a first element may be referred to as a second element, and similarly, the second element may be referred to as the first element. As used herein, the term "and/or" includes any and all combinations of one or more of the associated listed items.

As used herein, the term "image forming job" may indicate various jobs related to images (e.g., printing, copying, scanning, or faxing), such as forming an image or creating, storing, or transmission of an image file, and the term "job" may refer to not only an image forming job but also a series of processes necessary for performing an image forming job.

In addition, the term "image forming apparatus" may refer to any apparatus capable of performing image forming jobs, such as a printer, a copier, a scanner, a faxing machine, a multi-function printer (MFP) a display apparatus, or the like.

In addition, the term "hard copy" refers to an operation of outputting an image to a printing medium such as paper, and "soft copy" refers to an operation of outputting an image to a display device such as a TV or a monitor or to a memory.

Also, the term "content" may refer to all types of data subject to an image forming job, such as a picture, an image, a document file, or the like.

In addition, the term "print data" may refer to data converted into a printable format for a printer.

The term "scan file" may refer to a file generated by scanning an image by using a scanner.

In addition, the term "user" may refer to a person who performs an operation related to an image forming job by using an image forming apparatus or a device connected with an image forming apparatus in a wired or wireless manner. The term "administrator" may refer to a person who has authority to access all the functions and systems of an image forming apparatus. The "administrator" and the "user" may be the same person.

The examples below relate to an image forming apparatus and a method of controlling the image forming apparatus, and a description of details well known to one of ordinary skill in the art to which the examples pertain will be omitted.

Hereinafter, examples of the disclosure will now be described more fully with reference to the accompanying drawings, in which examples of the disclosure are shown such that one of ordinary skill in the art may easily execute the disclosure. This disclosure may, however, be embodied in many different forms and should not be construed as limited to the examples set forth herein.

FIG. 1 illustrates a configuration of an image forming apparatus according to an example.

Referring to FIG. 1, an image forming apparatus 100 may include a user interface device 110, a controller 120, a communicator 130, a memory 140, and an image forming job unit 150. Further, although not illustrated, the image forming apparatus 100 may further include a power supply to supply power to each of the components.

The user interface device 110 may include an input unit for receiving, from a user, an input or the like to perform an image forming job and an output unit for displaying information on a result of an image forming job or a status of the image forming apparatus 100 or the like. For example, the user interface device 110 may include an operation panel for receiving a user input and a display panel for displaying a screen.

In more detail, the input unit may include devices capable of receiving various types of user inputs, such as a keyboard, a physical button, a touch screen, a camera a microphone, or the like. Further, the output unit may include, for example, a display panel, a speaker, or the like. However, the user interface device 110 is not limited thereto and may include devices that support various inputs and outputs.

The controller 120 controls an overall operation of the image forming apparatus 100 and may include at least one processor such as a central processing unit (CPU) or the like. The controller 120 may control other elements included in the image forming apparatus 100 such that an operation corresponding to a user input received via the user interface device 110 is performed. The controller 120 may include at least one specialized processor corresponding to each function, or may be a single integrated processor.

For example, the controller 120 may execute a program stored in the memory 140, read data or files stored in the memory 140 or store a new file in the memory 140.

The communicator 130 may perform wired or wireless communication with another device or a network. To this end, the communicator 130 may include a communication module, such as a transceiver, supporting at least one of various wired or wireless communication methods. For example, the communication module may be in the form of a chipset, or may be a sticker or a barcode (e.g., a sticker containing a Near Field Communication (NFC) tag) or the like that contains information necessary for communication.

Examples of wireless communication may include at least one of Wireless Fidelity (Wi-Fi), Wi-Fi Direct, Bluetooth, Ultra-wide Band (UWB) or NFC. Examples of wired communication may include at least one of, for example, Universal Serial Bus (USB) or High Definition Multimedia Interface (HDMI).

The communicator 130 may be connected to an external device located outside the image forming apparatus 100 and may transmit and receive signals or data. In an example, the image forming apparatus 100 is connected to a user terminal through the communicator 130. The communicator 130 may transmit signals or data received from the user terminal to the controller 120 or may transmit signals or data generated by the controller 120 to the user terminal. For example, when the communicator 130 receives a print instruction signal and print data from the user terminal, the controller 120 may output the received print data through a printing unit 151.

FIG. 2 is a view illustrating an image forming apparatus connected to a user terminal or a server according to an example.

Referring to FIG. 2, a user terminal 200 may include an input and output unit 210, a controller 220, a communicator 230, and a memory 240. The controller 220 may execute a program stored in the memory 240, and may transmit a signal or data generated as a result of the execution to the image forming apparatus 100 via the communicator 230 to control an image forming job. The user terminal 200 may include, for example, a smartphone, a tablet, a personal computer (PC), a household appliance, a medical device, a camera, a wearable device, or the like.

The communicator 130 may be directly connected to a server 300 to transmit or receive signals or data. In addition, the communicator 130 may also be connected to the user terminal 200 via the server 300. That is, the communicator 130 of the image forming apparatus 100 may transmit or receive signals or data to or from the communicator 230 of the user terminal 200 via the server 300.

Referring back to FIG. 1, various types of data such as files and programs including applications may be installed and stored on the memory 140. The controller 120 may access data stored in the memory 140 and use the data or may store new data in the memory 140. In addition, the controller 120 may execute a program installed on the memory 140. In addition, the controller 120 may install an application received from the outside via the communicator 130, on the memory 140.

The image forming job unit 150 may perform an image forming job such as printing, copying, scanning or faxing.

The image forming job unit 150 is illustrated as including the printing unit 151, a scanning unit 152, and a faxing unit 153. However, according to necessity, only some of these elements may be included or another element for performing other type of image forming job may also be included.

The printing unit 151 may form an image on a recording medium by using various printing methods such as an electrophotographic method, an inkjet method, a thermal transfer method, a direct thermal method, or the like.

The scanning unit 152 may irradiate light onto a printing medium, receive reflected light using a image sensor, and read an image recorded to the printing medium. A charge coupled device (CCD), a contact type image sensor (CIS), or the like may be used as the image sensor reading an image from the printing medium. The scanning unit 152 may have a flatbed structure in which a printing medium is located at a fixed position and an image is read as an image sensor is moved, a document feed structure in which an image sensor is located at a fixed position and a printing medium is fed, or a combined structure of these structures.

The faxing unit 153 may share with the scanning unit 152 elements used to scan an image, and share with the printing unit 151 elements used to print a received file, and may transmit a scanned file to a destination or receive a file from the outside.

The names of the elements of the image forming apparatus 100 described above may vary. In addition, the image forming apparatus 100 according to the disclosure may include at least one of the above-described elements, or some of them may be omitted or other additional elements may be further included.

The user interface device 110 may also include an independent control system. That is, apart from the controller 120 of the image forming apparatus 100, a control system that controls a user interface (UI) provided by the user interface device 110 (a controller, a memory or the like) may also be included. In addition, in the control system of the user interface device 110, programs such as an operating system (OS) providing an UI or an application supporting various functions may be installed.

FIG. 3 is a block diagram of a user interface device according to an example.

Referring to FIG. 3, the user interface device 110 may include a controller 111, a display unit 112, an operation panel 113, and a memory 114.

As illustrated in FIG. 3, the user interface device 110 may include an independent control system (e.g., the controller 111 and the memory 114) apart from the controller 120. The controller 111 and the memory 114 may control a user interface provided by the user interface device 110. Like the controller 120, the controller 111 may include a processor such as a CPU.

The display unit 112 may include a liquid crystal display (LCD) panel, an organic light emitting diode (OLED) panel, or the like, and the operation panel 113 may include a physical button, a touch screen, or the like.

The user interface device 110 may be separable from the image forming apparatus 100. For example, the user interface device 110 may operate in a similar manner as a tablet when it is separated from the image forming apparatus 100, and when it is combined with the image forming apparatus 100, the user interface device 110 may perform an input and output function. When the user interface device 110 is separable, the user interface device 110 may further include a communicator to perform communication with an external device.

FIG. 4 is a diagram for describing an operation of transmitting and receiving encrypted data between an image forming apparatus and an external device by using an encryption protocol and an encryption algorithm according to an example.

Referring to FIG. 4, the image forming apparatus 100 may include a plurality of network components that use an encryption protocol and an encryption algorithm. For example, by using network components, the image forming apparatus 100 may transmit or receive data to or from an external device that uses Simple Mail Transfer Protocol Secure (SMTPS), Post Office Protocol 3 Secure (POP3S), 802.1x, Lightweight Directory Access Protocol Secure (LDAPS), File Transfer Protocol Secure (FTPS), Hyper Text Transfer Protocol Secure (HTTPS), SCP, or the like. The external device may be, without limitation, a server.

For example, in regard to security of an email server that uses SMTPS, an encryption protocol may be set to TLS.1, and an encryption algorithm may be set to AES256, AES128, and 3DES. In order for the image forming apparatus 100 to transmit or receive encrypted data to or from the email server, an encryption protocol of the image forming apparatus 100 is to be set to TLS1.2, and an encryption algorithm thereof is to be set to one of AES256, AES128, and 3DES.

When one external device is to be connected to the image forming apparatus 100, an encryption protocol and an encryption algorithm of the image forming apparatus 100 may simply be respectively matched with an encryption protocol and an encryption algorithm of the one external device to be connected to the image forming apparatus 100. However, when a plurality of external devices are to be connected to the image forming apparatus 100, setting encryption protocols and encryption algorithms of the plurality of external devices increases the burden of a management task. Thus, a method of integrally controlling an encryption protocol and an encryption algorithm of the image forming apparatus 100 is needed.

The image forming apparatus 100 may obtain information of encryption protocols and encryption algorithms respectively applied to external devices corresponding to network components of the image forming apparatus 100, compare the information of the encryption protocols and the encryption algorithms with information of the encryption protocol and the encryption algorithm set to the image forming apparatus 100 to thereby reset at least one of the encryption protocol and the encryption algorithm of the image forming apparatus 100, thereby transmitting data that is encrypted with respect to each of the external devices respectively corresponding to the network components.

FIG. 5 is a structural diagram of an image forming apparatus according to an example.

Referring to FIG. 5, the image forming apparatus 100 may include a user interface device 110, a controller 120, and a communicator 130. However, not all of the illustrated components are essential elements. The image forming apparatus 100 may also be implemented by more or fewer elements than the number of the illustrated elements. Hereinafter, the above elements will be described.

The controller 120 may obtain security setting information of one or more external devices. In more detail, the controller 120 may search for one or more external devices to be connected to the image forming apparatus 100, and obtain security setting information of the found one or more external devices. Here, the one or more external devices are devices to perform communication with the image forming apparatus 100. The security setting information of the one or more external devices may include information of an encryption protocol and an encryption algorithm that are used for the one or more external devices to transmit or receive encrypted data to or from the image forming apparatus 100. The external device may be, without limitation, a server.

The controller 120 may obtain information of an encryption protocol and an encryption algorithm of one or more external devices through an encryption protocol handshake operation. In more detail, the controller 120 may transmit a hello message to one or more external devices, and may receive, from one or more external devices, a protocol version and information transmitted as a cipher suite value as a response message to the hello message. The controller 120 may obtain information of an encryption protocol and an encryption algorithm that are activated in an external device by using the protocol version and the information transmitted as the cipher suite value.

The controller 120 may compare the obtained security setting information of the one or more external devices with security setting information set to the image forming apparatus 100. The security setting information set to the image forming apparatus 100 may include information of an encryption protocol and an encryption algorithm that are activated from among a plurality of encryption protocols and a plurality of encryption algorithms supported by the image forming apparatus 100. The controller 120 may determine, based on a result of the comparing, whether encrypted data may be transmitted or received between the image forming apparatus 100 and one or more external devices.

The controller 120 may determine a defect in security set to the image forming apparatus 100 based on a determination on whether encrypted data may be transmitted or received between the image forming apparatus 100 and one or more external devices.

In addition, based on a result of comparing security setting information of one or more external devices and security setting information set to the image forming apparatus 100, the controller 120 may determine an item to be changed from among the security setting information of the image forming apparatus 100. The controller 120 may update a setting of determined items.

In more detail, the controller 120 may determine a first item which is needed for communication between one or more external devices and the image forming apparatus 100, from among inactivated items of the security setting information of the image forming apparatus 100, to be an item to be changed, and may change an inactive state of the first item to an active state.

In addition, the controller 120 may determine a second item which is not needed for communication between one or more external devices and the image forming apparatus 100 from among activated items of the security setting information of the image forming apparatus 100, to be an item to be changed, and may change an active state of the second item to an inactive state.

The controller 120 may control the image forming apparatus 100 and one or more external devices such that they may transmit or receive encrypted data to or from each other based on the updated security setting information of the image forming apparatus 100.

The user interface device 110 refers to a device that receives data used to control the image forming apparatus 100, from a user. The controller 120 may control a display unit of the user interface device 110 such that the display unit generates and outputs a user interface screen to receive a preset instruction or data from the user.

The user interface device 110 may output information about a defect in security set to the image forming apparatus 100. The user interface device 110 may display the information about the defect on the display unit of the user interface device 110, and may receive an input for changing security setting information of the image forming apparatus 100. In more detail, the user interface device 110 may receive an input for changing at least one of an encryption protocol and an encryption algorithm set to the image forming apparatus 100.

In addition, the user interface device 110 may differently display each of a plurality of encryption protocols and encryption algorithms supported by the image forming apparatus 100 by distinguishing whether they are in an active state or in an inactive state.

The user interface device 110 may display security setting information of one or more external devices. That is, the user interface device 110 may display information of an encryption protocol and an encryption algorithm that may be used by one or more external devices to transmit and receive encrypted data to or from the image forming apparatus 100.

In addition, based on the defect information, the user interface device 110 may differently display a first item and a second item of the security setting information set to the image forming apparatus 100 by distinguishing between the first item which is to be activated and the second item which is to be inactivated.

The communicator 130 may receive data from one or more external devices and/or transmit data to one or more external devices. For example, the communicator 130 may transmit encrypted data by using an encryption protocol and an encryption algorithm set to the image forming apparatus 100 and the one or more external devices, to the one or more external devices.

The communicator 130 may be connected to one or more external devices through a communication network based on WiFi or WiFi-Direct. Examples of wireless communication networks that are accessible by the communicator 130 include, without limitation, a wireless LAN, WiFi, a Bluetooth, a Zigbee, a WiFi-Direct, an Ultra-wide band (UWB), Infrared Data Association (IrDA), a Bluetooth Low Energy (BLE), a Near Field Communication (NFC), and the like.

The communicator 130 may include a plurality of network components used to transmit and receive encrypted data to or from an external device by using the security setting information of the image forming apparatus 100. That is, each of the plurality of network components may be used to communicate with a network component of an external device by using a preset encryption protocol and a preset encryption algorithm.

In addition, the communicator 130 may transmit defect information to a first external device associated with the defect information. The communicator 130 may receive an instruction for changing at least one of an encryption protocol and an encryption algorithm set to the image forming apparatus 100. The controller 120 may reset the security setting information of the image forming apparatus 100 based on the received instruction to control the first external device and the image forming apparatus 100 such that encrypted data is transmitted or received between the first external device and the image forming apparatus 100.

The image forming apparatus 100 may further include a memory (not shown). The memory (not shown) may store programs, data, or files associated with the image forming apparatus 100. The controller 120 may execute a program stored in the memory (not shown), read data or files stored in the memory (not shown) or store a new file in the memory (not shown).

The memory (not shown) may store information of a plurality of encryption protocols and a plurality of encryption algorithms supported by the image forming apparatus 100. The information of the encryption protocols may include version information of the encryption protocols. In addition, the memory (not shown) may store information of an encryption protocol and an encryption algorithm of one or more external devices. In addition, the memory (not shown) may store a result of comparing security setting information of one or more external devices with security setting information of the image forming apparatus 100, and may store input information used to reset the security setting information of the image forming apparatus 100 based on the result of comparing and updated security setting information of the image forming apparatus 100.

The memory (not shown) may store information of an encryption protocol and an encryption algorithm with respect to a network component corresponding to one or more external devices. The memory (not shown) may store status information of an encryption protocol and an encryption algorithm with respect to a network component (e.g., an active state, an inactive state).

The image forming apparatus 100 may include a central processing unit to control overall operations of the user interface device 110, the controller 120, the communicator 130, and the memory (not shown). The central processing unit may be implemented by an array of multiple logic gates, or may be implemented by a combination of a general-purpose microprocessor and a memory storing a program executable by the microprocessor. In addition, it will be understood by those skilled in the art that the disclosure may be implemented in other forms of hardware.

Hereinafter, features of the image forming apparatus 100 may be understood as ordinary implementation even if the features of the image forming apparatus 100 are not specified, and the scope of the disclosure is not limited by the names of particular features or physical or logical structures of the particular features.

FIG. 6 is a diagram for describing an operation of determining a defect in security information set to an image forming apparatus and resetting security of the image forming apparatus based on defect information according to an example.

Referring to FIG. 6, the controller 120 of the image forming apparatus 100 may search for one or more external devices 400 and 400-2 to be connected to the image forming apparatus 100 in operation S610. As illustrated in FIG. 6, a first external device 400 and a second external device 400-2 may attempt to set a communication connection to the image forming apparatus 100 to transmit or receive data to or from the image forming apparatus 100.

In operation S611, the first external device 400 may transmit security setting information of the first external device 400 to the image forming apparatus 100. The security setting information of the first external device 400 may include information of an encryption protocol and an encryption algorithm that are used for the first external device 400 to transmit or receive encrypted data to or from the image forming apparatus 100. For example, an encryption protocol used by the first external device 400 to perform communication with the image forming apparatus 100 may be TLS 1.0, and an encryption algorithm used by the first external device 400 to perform communication with the image forming apparatus 100 may be 3DES.

In operation S612, the second external device 400-2 may transmit security setting information of the second external device 400-2 to the image forming apparatus 100. Security setting information of the second external device 400-2 may include information of an encryption protocol and an encryption algorithm that are used for the second external device 400-2 to transmit or receive encrypted data to or from the image forming apparatus 100. For example, an encryption protocol used by the second external device 400-2 to perform communication with the image forming apparatus 100 may be TLS 1.2 and TLS 1.1, and an encryption algorithm used by the second external device 400-2 to perform communication with the image forming apparatus 100 may be AES256 and AES128.

In operation S620, the controller 120 of the image forming apparatus 100 may compare security setting information of one or more external devices with security setting information set to the image forming apparatus 100 to determine whether encrypted data may be transmitted or received between the image forming apparatus 100 and the one or more external devices. For example, an encryption protocol set to the image forming apparatus 100 may be TLS 1.2 and TLS 1.1, and an encryption algorithm set to the image forming apparatus 100 may be AES256, AES128, 3DES, and RC4.

The controller 120 of the image forming apparatus 100 may determine that the encryption protocol set to the first external device 400 (TLS 1.0) is not set as an encryption protocol of the image forming apparatus 100. The controller 120 of the image forming apparatus 100 may determine that encrypted data cannot be transmitted or received between the image forming apparatus 100 and the first external device 400 under the current security status set to the image forming apparatus 100.

On the other hand, the controller 120 of the image forming apparatus 100 may determine that the encryption protocol (TLS 1.2, TLS 1.1) and the encryption algorithm (AES256, AES128) set to the second external device 400-2 are included in the encryption protocols (TLS 1.2, TLS 1.1) and the encryption algorithms (AES256, AES128, 3DES, RC 4) set to the image forming apparatus 100. The controller 120 of the image forming apparatus 100 may determine that encrypted data can be transmitted or received between the image forming apparatus 100 and the second external device 400-2 under the current security status set to the image forming apparatus 100.

In operation S621, the controller 120 of the image forming apparatus 100 may control the image forming apparatus 100 and the second external device 400-2 such that encrypted data may be transmitted or received between the image forming apparatus 100 and the second external device 400-2.

In operation S630, the controller 120 of the image forming apparatus 100 may determine a defect of security of the image forming apparatus 100. The controller 120 of the image forming apparatus 100 may determine a defect in an encryption protocol in regard to transmitting or receiving data between the image forming apparatus 100 and the first external device 400. The controller 120 of the image forming apparatus 100 may determine whether an encryption protocol of the first external device 400 is included among a plurality of encryption protocols supported by the image forming apparatus 100.

In operation S631, the controller 120 of the image forming apparatus 100 may transmit security defect information to the user interface device 110 of the image forming apparatus 100.

In operation S640, the user interface device 110 of the image forming apparatus 100 may output the security defect information. In more detail, the user interface device 110 of the image forming apparatus 100 may display information of an encryption protocol that needs to be activated or an encryption protocol that needs to be inactivated from among a plurality of encryption protocols supported by the image forming apparatus 100. In addition, the user interface device 110 of the image forming apparatus 100 may display information of an encryption algorithm that needs to be activated or an encryption algorithm that needs to be inactivated from among a plurality of encryption algorithms supported by the image forming apparatus 100.

In operation S650, the user interface device 110 of the image forming apparatus 100 may receive an input for changing security information from the user. The user interface device 110 of the image forming apparatus 100 may receive an input for changing at least one of an encryption protocol and an encryption algorithm set to the image forming apparatus 100 such that encrypted data may be transmitted or received between the image forming apparatus 100 and the first external device 400. For example, the user interface device 110 of the image forming apparatus 100 may receive an input for activating an inactivated encryption protocol, TLS 1.0.

In operation S651, the user interface device 110 of the image forming apparatus 100 may transmit an input for changing security information to the controller 120 of the image forming apparatus 100.

In operation S660, the controller 120 of the image forming apparatus 100 may reset security information of the image forming apparatus 100 based on the input for changing the security information. For example, the controller 120 of the image forming apparatus 100 may change the encryption protocol in an inactivated state, that is, TLS 1.0, to an active state.

In operation S661, the controller 120 of the image forming apparatus 100 may control the image forming apparatus 100 such that the image forming apparatus 100 transmits or receives encrypted data to or from the first external device 400.

FIG. 7 is a diagram for describing an operation of updating security setting information of an image forming apparatus according to an example.

Referring to FIG. 7, the controller 120 of the image forming apparatus 100 may determine an item to be changed from among security setting information of the image forming apparatus 100 based on a result of comparing security setting information of the first external device 400 with the security setting information set to the image forming apparatus 100 in operation S710. For example, the controller 120 of the image forming apparatus 100 may determine that an inactivated state of the encryption protocol, TLS 1.0, is to be changed to an active state.

In more detail, based on a result of comparing the security setting information of the first external device 400 with the security setting information set to the image forming apparatus 100, the controller 120 of the image forming apparatus 100 may determine that a first item needed for communication between the first external device 400 and the image forming apparatus 100, to be activated, from among inactivated items of the security setting information of the image forming apparatus 100. That is, when a first encryption protocol and/or a first encryption algorithm needed for a normal service of the image forming apparatus 100 are inactivated, the controller 120 of the image forming apparatus 100 may control an operation of the image forming apparatus 100 such that an inactivated state of the first encryption protocol and/or the first encryption algorithm is changed to an active state.

In addition, based on a result of comparing the security setting information of the first external device 400 with the security setting information set to the image forming apparatus 100, the controller 120 of the image forming apparatus 100 may determine that a second item needed for communication between the first external device 400 and the image forming apparatus 100 is to be inactivated from among activated items of the security setting information of the image forming apparatus 100. That is, when a second encryption protocol and/or a second encryption algorithm that are not used by an external device and thus are unnecessary for providing a service of the image forming apparatus 100 are activated, the controller 120 of the image forming apparatus 100 may control an operation of the image forming apparatus 100 such that an activated state of the second encryption protocol and/or the second encryption algorithm is changed to an inactive state.

In operation S711, the controller 120 of the image forming apparatus 100 may transmit item information that is to be changed to the user interface device 110 of the image forming apparatus 100.

In operation S720, the user interface device 110 of the image forming apparatus 100 may display item information that is to be changed from among the security setting information set to the image forming apparatus 100.

In operation S721, the user interface device 110 of the image forming apparatus 100 may receive a setting instruction of an item to be changed, from a user, and transmit the setting instruction to the controller 120 of the image forming apparatus 100. For example, a setting instruction with respect to an item to be changed may be an input for changing an inactivated state of the encryption protocol, TLS 1.0, to an active state.

In operation S730, the controller 120 of the image forming apparatus 100 may update security setting information of the image forming apparatus 100 based on the received instruction. For example, the controller 120 of the image forming apparatus 100 may change an inactivated state of the encryption protocol, TLS 1.0, to an active state.

In operation S731, the controller 120 of the image forming apparatus 100 may transmit the updated security setting information of the image forming apparatus 100 to the user interface device 110 of the image forming apparatus 100.

In operation S740, the user interface device 110 of the image forming apparatus 100 may display the updated security setting information of the image forming apparatus 100.

FIG. 8 illustrates an example of displaying a screen to set security of an image forming apparatus on a user interface of the image forming apparatus according to an example.

Referring to FIG. 8, the user interface device 110 may display a screen formed by a combination of a window 810 providing a button that starts inspection of security setting defects, a window 820 displaying security setting information of the image forming apparatus 100, a window 830 displaying security setting information of an external device found through search, and a window 840 displaying defect information of the security setting of the image forming apparatus 100. It is to be understood by those skilled in the art that the screen illustrated in FIG. 8 is merely an example, and that the above-described windows may be omitted on the screen and new windows may be added to the screen.

Referring to the window 810 providing a button to start inspection of security setting defects illustrated in FIG. 8, the user interface device 110 may display a scan button to search for an external device that is to perform communication with the image forming apparatus 100. The user interface device 110 may receive an input for selecting a scan button from a user to search for an external device. The user interface device 110 may obtain and display security setting information of the found external device. In addition, the user interface device 110 may obtain and display security setting defect information of the image forming apparatus 100.

Referring to the window 820 displaying security setting information of the image forming apparatus 100, the user interface device 110 may display information of a plurality of encryption protocols (TLS1.2, TLS1.1, TLS1.0, SSLv3.0) and a plurality of encryption algorithms (AES256, AES128, 3DES, RC4) supported by the image forming apparatus 100. The user interface device 110 may distinguish activated encryption protocols (TLS1.1, TLS1.1) or encryption algorithms (AES256, AES128, 3DES, RC4) from inactivated encryption protocols (TLS1.0, SSLv3.0) or encryption algorithms from among the plurality of encryption protocols (TLS1.2, TLS1.1, TLS1.0, SSLv3.0) and the plurality of encryption algorithms (AES256, AES128, 3DES, RC4).

Referring to the window 830 displaying security setting information of the found external device and the window 840 displaying defect information of security setting of the image forming apparatus 100, before searching for an external device that is to perform communication with the image forming apparatus 100, the user interface device 110 may display a message "security defect is not yet diagnosed" on a window of the external device displaying security setting information, and display a message "security defect not yet diagnosed" on a window displaying defect information of the image forming apparatus 100.

FIG. 9 illustrates an example of a table including security setting information of an external device in an image forming apparatus according to an example.

Referring to FIG. 9, the image forming apparatus 100 may search for a plurality of external devices to be connected to the image forming apparatus 100. The image forming apparatus 100 may obtain security setting information of a plurality of external devices that are found through search. In more detail, the image forming apparatus 100 may obtain an encryption protocol and an encryption algorithm used by the plurality of external devices to transmit or receive encrypted data to or from the image forming apparatus 100.

The image forming apparatus 100 may include a plurality of network components that use a plurality of encryption protocols and encryption algorithms. As illustrated in FIG. 9, each of the network components may use one of LDAPS, FTPS, SMTPS, and 802.1x to transmit or receive encrypted data with an external device according to an encryption protocol and an encryption algorithm set to the external device.

As illustrated in FIG. 9, the image forming apparatus 100 may store information of an encryption protocol 910 and an encryption algorithm 920 with respect to each of the network components. In more detail, based on the encryption protocol and encryption algorithm set to the external device, the image forming apparatus 100 may distinguish activated items from inactivated items of the network components and record and store the active and inactive items differently. That is, the image forming apparatus 100 may store information with respect to a version of an encryption protocol 910 and whether an encryption algorithm 920 is active or inactive based on information of the encryption protocol and the encryption algorithm set to the external device.

FIG. 10 illustrates an example of a table including security setting information of an image forming apparatus according to an example.

Referring to FIG. 10, the image forming apparatus 100 may store information of a plurality of encryption protocols and a plurality of encryption algorithms supported by the image forming apparatus 100. As illustrated in FIG. 10, the image forming apparatus 100 may distinguish activated encryption protocols and inactivated encryption protocols from among a plurality of encryption protocols, and record and store the activated and inactivated encryption protocols differently. In addition, the image forming apparatus 100 may distinguish activated encryption algorithms and inactivated encryption algorithms from among a plurality of encryption algorithms, and record and store the activated and inactivated encryption algorithms differently.

FIG. 11 illustrates an example of a table recording items to be updated from among security setting information of an image forming apparatus according to an example.

Referring to FIG. 11, the image forming apparatus 100 may compare security setting information of an external device with security setting information set to the image forming apparatus 100. In addition, based on a result of the comparison above, the image forming apparatus 100 may display a first item to be activated and a second item to be inactivated by distinguishing the first and second items of the security setting information set to the image forming apparatus 100. For example, as illustrated in FIG. 11, the image forming apparatus 100 may display an encryption protocol to be activated from among encryption protocols, with the mark "+" (1101). In addition, the image forming apparatus 100 may display an encryption algorithm to be inactivated from among encryption algorithms, with the mark "−" (1102).

FIG. 12 illustrates an example of determining a security defect of an image forming apparatus and displaying a screen providing defect information on a user interface device of the image forming apparatus according to an example.

Referring to FIG. 12, the user interface device 110 of the image forming apparatus 100 may display a screen 1210 for setting security of the image forming apparatus 100. The user interface device 110 may display a scan button for searching for an external device that is to perform communication with the image forming apparatus 100. The user interface device 110 may display information of a plurality of encryption protocols (TLS1.2, TLS1.1, TLS1.0, SSLv3.0) and a plurality of encryption algorithms (AES256, AES128, 3DES, RC4) supported by the image forming apparatus 100. The user interface device 110 may distinguish between activated encryption protocols (TLS1.2, TLS1.1) and inactivated encryption protocols (TLS1.0, SSLv3.0) in the image forming apparatus 100, for example by displaying them differently. In addition, the user interface device 110 may distinguish between activated encryption algorithms (AES256, AES128, 3DES) and inactivated encryption algorithms (RC4) in the image forming apparatus 100, for example by displaying them differently.

The user interface device 110 may receive an input for selecting a scan button from a user to search for an external device. The user interface device 110 may display a screen 1220 displaying security setting information 1221 of an external device that is found through search and security setting defect information 1222 of the image forming apparatus 100.

In more detail, the user interface device 110 may obtain first security setting information of a first external device that uses LDAPS. The first security setting information may include information of an encryption protocol, TLS1.0, and encryption algorithms, AES256, AES128, and 3DES.

The user interface device 110 may obtain second security setting information of a second external device that uses SMTPS. The second security setting information may include information of encryption protocols, TLS1.2, TLS1.1, and TLS1.0 and encryption algorithms, AES256, AES128, and 3DES.

The user interface device 110 may obtain third security setting information of a third external device that uses FTPS. The third security setting information may include information of encryption protocols, TLS1.2 and TLS1.1, and encryption algorithms, AES256 and AES128.

The user interface device 110 may obtain fourth security setting information of a fourth external device that uses 802.1x. The fourth security setting information may include information of an encryption protocol, TLS1.0, and encryption algorithms, AES256, AES128, and 3DES.

The user interface device 110 may display encryption protocols and encryption algorithms respectively set to the first through fourth external devices.

The image forming apparatus 100 may compare the encryption protocols and the encryption algorithms respectively set to the first through fourth external devices with an encryption protocol and an encryption algorithm set to the image forming apparatus 100. The image forming apparatus 100 may determine, based on a result of the above comparison, whether the encryption protocol of the image forming apparatus 100, TLS1.0, which is in an inactive state is to be changed into an active state. The user interface device 110 may display a message indicating that TLS1.0 is to be changed into an active state.

FIG. 13 illustrates an example of determining a security defect of an image forming apparatus and displaying a screen providing defect information on a user interface device of the image forming apparatus according to another example.

Referring to FIG. 13, the user interface device 110 of the image forming apparatus 100 may display a screen 1310 for setting security of the image forming apparatus 100. The user interface device 110 may display a scan button for searching for an external device that is to perform communication with the image forming apparatus 100. The user interface device 110 may display information of a plurality of encryption protocols (TLS1.2, TLS1.1, TLS1.0, SSLv3.0) and a plurality of encryption algorithms (AES256, AES128, 3DES, RC4) supported by the image forming apparatus 100. The user interface device 110 may distinguish between encryption protocols (TLS1.2, TLS1.1, TLS1.0) activated in the image forming apparatus 100 and an encryption protocol (SSLv3.0) that is inactivated in the image forming apparatus 100 and display them differently. In addition, the user interface device 110 may display encryption algorithms supported by the image forming apparatus 100 as activated encryption algorithms (AES256, AES128, 3DES, RC4).

The user interface device 110 may receive an input for selecting a scan button from a user to search for an external device. The user interface device 110 may display a screen 1320 displaying security setting information 1321 of an external device that is found through search and security setting defect information 1322 of the image forming apparatus 100.

As described with reference to FIG. 12, the user interface device 110 may display encryption protocols and encryption algorithms respectively set to the first through fourth external devices.

The image forming apparatus 100 may compare the encryption protocols and the encryption algorithms respectively set to the first through fourth external devices with an encryption protocol and an encryption algorithm set to the image forming apparatus 100. The image forming apparatus 100 may determine, based on a result of the comparison above, that the encryption algorithm of the image forming apparatus 100, RC4, which is in an active state, is to be changed into an inactive state. The user interface device 110 may display a message indicating that RC4 is to be changed into an inactive state. The image forming apparatus 100 may eliminate or reduce a potential security vulnerability associated with RC4 by inactivating the encryption algorithm of RC4 which is not needed.

FIG. 14 is a diagram for describing an operation of determining a defect in security information set to an image forming apparatus and resetting security of the image forming apparatus based on defect information according to another example.

Referring to FIG. 14, the controller 120 of the image forming apparatus 100 may search for one or more external devices to be connected to the image forming apparatus 100 in operation S1410. As illustrated in FIG. 12, a first external device 400 and a second external device 400-2 may attempt to set a communication connection to transmit and receive data to and from the image forming apparatus 100.

In operation S1411, the first external device 400 may transmit security setting information of the first external device to the image forming apparatus 100. In operation S1412, the second external device 400-2 may transmit security setting information of the second external device to the image forming apparatus 100. Here, security setting information of an external device may include information of an encryption protocol and an encryption algorithm that are used for the external device to transmit or receive encrypted data to or from the image forming apparatus 100.

In operation S1420, the controller 120 of the image forming apparatus 100 may compare security setting information of one or more external devices with security setting information set to the image forming apparatus 100 to determine whether encrypted data may be transmitted or received between the image forming apparatus 100 and the one or more external devices. The controller 120 of the image forming apparatus 100 may determine, based on a result of comparison above, that it is impossible to transmit or receive encrypted data between the image forming apparatus 100 and the first external device 400, and that encrypted data may be transmitted or received between the image forming apparatus 100 and the second external device 400-2.

In operation S1421, the controller 120 of the image forming apparatus 100 may control the image forming apparatus 100 and the second external device 400-2 such that encrypted data may be transmitted or received between the image forming apparatus 100 and the second external device 400-2.

In operation S1430, the controller 120 of the image forming apparatus 100 may determine a defect of security of the image forming apparatus 100. The controller 120 of the image forming apparatus 100 may determine a defect in an encryption protocol in regard to transmitting or receiving data between the image forming apparatus 100 and the first external device 400. The controller 120 of the image forming apparatus 100 may determine whether an encryption protocol of the first external device 400 is included among a plurality of encryption protocols supported by the image forming apparatus 100.

In operation S1431, the controller 120 of the image forming apparatus 100 may transmit security defect information to the user interface device 110 of the image forming apparatus 100. In operation S1440, the user interface device 110 of the image forming apparatus 100 may output the security defect information.

In operation S1432, the controller 120 of the image forming apparatus 100 may transmit the security defect information to the first external device 400. In operation S1433, the controller 120 of the image forming apparatus 100 may receive an instruction for changing an encryption protocol and an encryption algorithm set to the image forming apparatus 100, from the first external device 400. In operation S1450, the controller 120 of the image forming apparatus 100 may reset security information of the image forming apparatus 100 based on an input for changing the security information. In operation S1452, the controller 120 of the image forming apparatus 100 may control the image forming apparatus 100 such that the image forming apparatus 100 transmits or receives encrypted data to or from the first external device 400.

In operation S1451, the controller 120 of the image forming apparatus 100 may transmit updated security setting information of the image forming apparatus 100 to the user interface device 110 of the image forming apparatus 100. In operation S1460, the user interface device 110 of the image forming apparatus 100 may output the updated security setting information of the image forming apparatus 100.

FIG. 15 is a flowchart of a method of operating an image forming apparatus according to an example.

Referring to FIG. 15, the image forming apparatus 100 may obtain security setting information of one or more external devices that are to perform communication with the image forming apparatus 100 in operation S1510. Security setting information of one or more external devices may include, without limitation, information of an encryption protocol and an encryption algorithm that are used for the one or more external devices to transmit or receive encrypted data to or from the image forming apparatus 100.

The image forming apparatus 100 may obtain information of an encryption protocol and an encryption algorithm of one or more external devices through an encryption protocol handshake operation. In more detail, the image forming apparatus 100 may transmit a hello message to one or more external devices, and may receive, from one or more external devices, a protocol version and information transmitted as a cipher suite value as a response message to the hello message. The image forming apparatus 100 may obtain information of an encryption protocol and an encryption algorithm that are activated in an external device by using the protocol version and the information transmitted as the cipher suite value.

In operation S1520, the image forming apparatus 100 may compare security setting information of one or more external devices with security setting information set to the image forming apparatus 100 to determine whether encrypted data may be transmitted or received between the image forming apparatus 100 and one or more external devices.

The security setting information set to the image forming apparatus 100 may include information of an encryption protocol and an encryption algorithm that are activated from among a plurality of encryption protocols and a plurality of encryption algorithms supported by the image forming apparatus 100.

In operation S1530, the image forming apparatus 100 may determine a defect of security set to the image forming apparatus 100 based on the above determination.

In operation S1540, the image forming apparatus 100 may output defect information set to the image forming apparatus 100. In addition, the image forming apparatus 100 may display information of an encryption protocol and an encryption algorithm set to one or more external devices that are found through search. The image forming apparatus 100 may display information of a plurality of encryption protocols and a plurality of encryption algorithms supported by the image forming apparatus 100. In this case, the image forming apparatus 100 may distinguish whether each of the plurality of encryption protocols and the plurality of encryption algorithms is in an active state or an inactive state and display them differently. In addition, based on the defect information, the image forming apparatus 100 may distinguish between a first item to be activated and a second item to be inactivated, from among the security setting information set to the image forming apparatus 100, and display the first item and the second item differently. For example, the image forming apparatus 100 may display a first item to be activated, in bold to emphasize the same, and display a second item to be inactivated, with a dotted line.

In operation S1550, the image forming apparatus 100 may receive an input for changing the security setting information of the image forming apparatus 100, and update the security setting information of the image forming apparatus 100 based on the received input. The image forming apparatus 100 may control the image forming apparatus 100 based on the updated security setting information of the image forming apparatus 100 such that the image forming apparatus 100 transmits or receives encrypted data to or from one or more external devices.

FIG. 16 is a flowchart of a method of operating an image forming apparatus in which security setting information of the image forming apparatus is updated to control the image forming apparatus and an external device such that the image forming apparatus and the external device transmit and receive encrypted data to or from each other according to an example.

Referring to FIG. 16, based on a result of comparing security setting information of one or more external devices and security setting information set to the image forming apparatus 100, the image forming apparatus 100 may activate a first item needed for communication with one or more external devices, from among inactivated items of the security setting information of the image forming apparatus 100 in operation S1610.

In operation S1620, based on a result of comparing security setting information of one or more external devices and security setting information set to the image forming apparatus 100, the image forming apparatus 100 may inactivate a second item not needed for communication with one or more external devices, from among activated items of the security setting information of the image forming apparatus 100.

In operation S1630, based on updated security setting information of the image forming apparatus 100, the image forming apparatus 100 may control the image forming apparatus 100 and one or more external devices such that encrypted data may be transmitted or received between the image forming apparatus 100 and the one or more external devices.

The image forming apparatus 100 may be realized in the form of a hardware component, a software component, and/or a combination of a hardware component and a software component. For example, the apparatus and corresponding components according to the above-described examples may be realized by using at least one or more general-use computers or special-purpose computers, such as a processor, a controller, an arithmetic logic unit (ALU), a digital signal processor, a microcomputer, a field-programmable array (FPA), a programmable logic unit (PLU), a microprocessor, or any type of device that may execute and respond to an instruction.

The image forming apparatus 100 may execute an operating system (OS) and one or more software applications running on the OS. In addition, the image forming apparatus 100 may access, store, manipulate, process, and generate data in response to execution of software.

For ease of understanding, it may be described that a single processing apparatus is used, but one of ordinary skill in the art will be aware that the processing apparatus may include a plurality of processing elements and/or a plurality of types of processing elements. For example, the processing apparatus may include a plurality of processors or a single processor, and a controller. The image forming apparatus 100 may have another processing configuration, such as a parallel processor.

The software may include a computer program, a code, instructions, or a combination of one or more of the foregoing, and may configure the processing apparatus so that the processing apparatus can operate as intended, or to independently or collectively give instructions to the processing apparatus.

The software and/or the data may be permanently or temporarily embodied in any type of machine, component, physical device, virtual equipment, computer storage media or devices, or transmitted signal waves, such that the software and/or the data is interpreted by the processing apparatus or provides an instruction or data to the processing apparatus. The software may be distributed over a networked computer system and stored or executed in a distributed manner. The software and the data may be stored on one or more computer readable recording media.

The method according to the examples may be embodied as program instructions executable by various computer means and may be recorded on a computer-readable recording medium. The computer-readable recording medium may include program instructions, data files, data structures, and the like separately or in combinations. The program instructions to be recorded on the computer-readable recording medium may be specially designed and configured for the examples or may be well-known to and available to one of ordinary skill in the art of computer software.

Examples of the non-transitory computer-readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program instructions (e.g., ROM, RAM, flash memories, etc.).

Examples of the program instructions are advanced language codes that can be executed by a computer by using an interpreter or the like as well as machine language codes made by a compiler.

The hardware devices can be configured to function as one or more software modules so as to perform operations according to examples, or vice versa.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

Therefore, the scope of the disclosure is defined not by the detailed description of the disclosure but by the appended claims and any equivalent ranges thereto.

The invention claimed is:

1. An image forming apparatus comprising:
a communicator to perform communication with one or more external devices;
a controller to:
obtain security setting information of the one or more external devices,
perform a comparison between the obtained security setting information of the one or more external devices with security setting information set to the image forming apparatus to determine based on a result of the comparison whether it is possible to transmit or receive encrypted data between the image forming apparatus and the one or more external devices, respectively, and
determine defect information corresponding to the one or more external devices, respectively, in the security setting information set to the image forming apparatus based on the result of the comparison,
the defect information to indicate an activation or deactivation change to be applied to an information item, from among information items, of the security setting information set to the image forming apparatus, corresponding to the one or more external devices, respectively, based on the result of the comparison; and a user interface device to output the defect information indicating the activation or deactivation change to be applied in the security setting information set to the image forming apparatus.

2. The image forming apparatus of claim 1,
wherein the security setting information of the one or more external devices comprises information items of an encryption protocol and an encryption algorithm that are used for the one or more external devices, respectively, to transmit or receive encrypted data to or from the image forming apparatus, and wherein the security setting information set to the image forming apparatus comprises the information items of an encryption protocol and an encryption algorithm that are capable of being activated or deactivated from among a plurality of encryption protocols and a plurality of encryption algorithms supported by the image forming apparatus.

3. The image forming apparatus of claim 2, wherein, based on the defect information, the user interface device distinguishes, for the security setting information set to the image forming apparatus, whether each information item of the plurality of encryption protocols and the plurality of encryption algorithms, respectively, is indicated in an active state or an inactive state, and displays the information item differently corresponding to the active state or the inactive state.

4. The image forming apparatus of claim 2, further comprising a memory to,
store the information items of the plurality of encryption protocols and the plurality of encryption algorithms supported by the image forming apparatus,
store the information items of an encryption protocol and an encryption algorithm of the one or more external devices, respectively.

5. The image forming apparatus of claim 1,
wherein to output the defect information, the user interface device displays the defect information and receives an input for the activation or deactivation change to be applied through changing at least one of the information items of an encryption protocol and an encryption algorithm set to the image forming apparatus, and wherein the controller controls, based on the input, the image forming apparatus such that the image forming apparatus transmits and receives encrypted data to or from the one or more external devices.

6. The image forming apparatus of claim 1, wherein the controller is to:
search for one or more external devices to be connected to the image forming apparatus, and
obtain the security setting information of the one or more external devices that is found through the search, and
wherein the user interface device displays the obtained security setting information of the one or more external devices.

7. The image forming apparatus of claim 1, wherein the controller is to:
update a setting of the information item as the activation or deactivation change to be applied to control the image forming apparatus and the one or more external devices such that the image forming apparatus and the one or more external devices transmit or receive encrypted data to or from each other.

8. The image forming apparatus of claim 7, wherein in response to the update of the setting of the information item, the controller activates a first item needed for communication between the one or more external devices and the image forming apparatus, from among inactivated items of the security setting information set to the image forming apparatus.

9. The image forming apparatus of claim 7, wherein in response to the update of the setting of the information item, the controller inactivates a second item not needed for communication between the one or more external devices and the image forming apparatus, from among activated items of the security setting information set to the image forming apparatus.

10. The image forming apparatus of claim 1, wherein, based on the defect information, the user interface device distinguishes between a first information item, among the information items, to be activated and a second information item, among the information items, to be inactivated, of the security setting information set to the image forming apparatus, and displays the first information item and the second information item differently.

11. The image forming apparatus of claim 1,
wherein the communicator is to:
transmit the defect information to a first external device, among the one or more external devices, associated with the defect information, and
receive an instruction for the activation or deactivation change to be applied through changing the information item which corresponds to an encryption protocol or an encryption algorithm set to the image forming apparatus, from the first external device, and wherein the controller controls, based on the instruction, the image forming apparatus such that the image forming apparatus transmits or receives encrypted data to or from the first external device.

12. A method of operating an image forming apparatus, the method comprising:
obtaining security setting information of one or more external devices that is to perform communication with the image forming apparatus;
determining whether it is possible to transmit or receive encrypted data between the image forming apparatus and the one or more external devices based on a result of comparing the obtained security setting information of the one or more external devices, respectively, with security setting information set to the image forming apparatus;
determining defect information corresponding to the one or more external devices, respectively, in the security setting information set to the image forming apparatus based on the result of the comparing,
the defect information to indicate an activation or deactivation change to be applied to an information item, from among information items, of the security setting information set to the image forming apparatus, corresponding to the one or more external devices, respectively, based on the result of the comparing; and
outputting the defect information indicating the activation or deactivation change to be applied in the security setting information set to the image forming apparatus.

13. The method of claim 12,
wherein the security setting information of the one or more external devices comprises information items of an encryption protocol and an encryption algorithm that are used for the one or more external devices, respectively, to transmit or receive encrypted data to or from the image forming apparatus, and wherein the security setting information set to the image forming apparatus comprises the information items of an encryption protocol and an encryption algorithm that are capable of being activated or deactivated from among a plurality of encryption protocols and a plurality of encryption algorithms supported by the image forming apparatus.

14. The method of claim 13, further comprising displaying security setting information of the image forming apparatus with security setting information of the one or more external devices, wherein the displaying of the security setting information of the image forming apparatus comprises distinguishing, based on the defect information, for the security setting information set to the image forming apparatus, whether each information item of the plurality of encryption protocols and the plurality of encryption algorithms, respectively, is indicated to be in an active state or an inactive state, and displaying the information item differently corresponding to the active state or the inactive state.

15. The method of claim 12, further comprising:

receiving an input for the activation or deactivation change to be applied through changing at least one of the information items of an encryption protocol and an encryption algorithm set to the image forming apparatus; and based on the input, controlling the image forming apparatus such that the image forming apparatus transmits and receives encrypted data to or from the one or more external devices.

16. The method of claim 12, further comprising searching for the one or more external devices that are to perform communication with the image forming apparatus.

17. The method of claim 12, further comprising: updating a setting of the information item as the activation or deactivation change to be applied; and controlling, based on the updating, the image forming apparatus and the one or more external devices such that the image forming apparatus and the one or more external devices transmit and receive encrypted data to and from each other.

18. The method of claim 17, wherein the updating the setting of the information item comprises:

activating a first item needed for communication between the one or more external devices and the image forming apparatus, from among inactivated items of the security setting information set to the image forming apparatus; and inactivating a second item not needed for communication between the one or more external devices and the image forming apparatus, from among activated items of the security setting information set to the image forming apparatus.

19. The method of claim 12, wherein the outputting the defect information comprises distinguishing, based on the defect information, a first information item, among the information items, to be activated and a second information item, among the information items, to be inactivated, of the security setting information set to the image forming apparatus, and displaying the first information item and the second information item differently.

20. A non-transitory computer readable recording medium having embodied thereon instructions for operating an image forming apparatus, the non-transitory computer readable recording medium comprising:

instructions for obtaining security setting information of one or more external devices that is to perform communication with the image forming apparatus;

instructions for determining whether it is possible to transmit or receive encrypted data between the image forming apparatus and the one or more external devices based on a result of comparing the obtained security setting information of the one or more external devices, respectively, with security setting information set to the image forming apparatus;

instructions for determining a-defect information corresponding to the one or more external devices, respectively, in the security setting information set to the image forming apparatus based on a result of the comparing, the defect information to indicate an activation or deactivation change to be applied to an information item, from among information items, of the security setting information set to the image forming apparatus, corresponding to the one or more external devices, respectively, based on the result of the comparing; and instructions for outputting the defect information indicating the activation or deactivation change to be applied in the security setting information set to the image forming apparatus.

\* \* \* \* \*